United States Patent [19]

Suzuki

[11] Patent Number: 4,484,786
[45] Date of Patent: Nov. 27, 1984

[54] TOP ROLLER

[76] Inventor: Takeshi Suzuki, 19, Hacchodori, 4-chome, Toyohashi-shi, Aichi, Japan

[21] Appl. No.: 568,522

[22] Filed: Jan. 6, 1984

Related U.S. Application Data

[63] Continuation of Ser. No. 359,764, Mar. 19, 1982, abandoned, which is a continuation of Ser. No. 129,661, Mar. 12, 1980, abandoned.

[51] Int. Cl.³ .................... F16C 19/22; F16C 33/34; F16C 21/00
[52] U.S. Cl. .................... 384/537; 29/116 R; 384/587
[58] Field of Search ............ 308/208, 190, 174, 175, 308/176, 187.1, 187.2, 191, DIG. 11; 29/116 R, 116 AD

[56] References Cited

U.S. PATENT DOCUMENTS

| | | | |
|---|---|---|---|
| 1,165,594 | 12/1915 | Hani | 308/180 |
| 2,873,484 | 2/1959 | Maurer | 29/116 R |
| 2,884,665 | 5/1959 | Schlums | 308/190 |
| 3,212,168 | 10/1965 | Sommer | 308/208 X |
| 3,681,831 | 8/1972 | Steichele | 29/116 R |
| 4,183,127 | 1/1980 | Suzuki | 29/116 R |

FOREIGN PATENT DOCUMENTS

| | | | |
|---|---|---|---|
| 971087 | 9/1964 | United Kingdom | 29/116 R |
| 152399 | 10/1962 | U.S.S.R. | 29/116 R |

Primary Examiner—Stuart S. Levy
Assistant Examiner—Thomas Hannon

[57] ABSTRACT

A top roller wherein the outer circumference of a doughnut-shaped stop ring which is in contact with a part of an arbor is fitted in a groove formed in an inner wall of a rotary cylindrical shell, retaining rings are fitted in each of two grooves which are spaced apart at respective rotating parts of the arbor, and a bearing consisting of a needle or balls is held between these two retaining rings.

3 Claims, 4 Drawing Figures

TOP ROLLER

This application is a continuation, of application Ser. No. 359,764, filed Mar. 19, 1982, which is a continuation of application Ser. No. 129,661, filed Mar. 12, 1980, both now abandoned.

BACKGROUND OF THE INVENTION

This invention relates to a top roller which is simple in construction and has a small number of parts. A conventional top roller comprises an arbor, at both ends of which are formed rotary parts of small diameter and rotary cells rotatably mounted thereto through a bearing. The bearing comprises a needle held by a retainer. The bearing is held by a support ring, one end of which is in contact with the stepped side face of the holding portion, and the other end of which is in contact with the retainer, and by a collar ring whose displacement is regulated by a retaining ring. The support ring is elongated for detachably supporting the rotary cell and has a notch where it is in contact with the retainer. This notched part is elastic so that it will not contact the rotary part of the arbor. The end of the support ring fits a recess of the rotary cell to hold the rotary cell. When the rotary cell is drawn in its axial direction, the end of the support ring leaves the recess.

However, in conventional top rollers of this type, the distance between the centers of the two rotary cells was kept equal to the length of the spindle gauge of a spinning machine. Thus, by elongating the support ring, the centers of the bearings and of the rotary cells tended not to correspond. Further, due to the eccentric weighting of the bearings, the rotation of the rotary cells tended to be unstable, causing eccentric abrasion on the retainer or the bearing. When oil such as grease was supplied around the needle, the grease leaked out between the support rings and the arbor. Thus, it was necessary to form oil supply grooves in the rotary parts of the arbor.

SUMMARY OF THE INVENTION

Accordingly, one of the objects of this invention is to provide a top roller wherein leakage of oil is prevented, oil is retained well, entry of fiber is prevented, and assembly of the top roller is easy.

This invention will now be described in detail with reference to the accompanying drawings.

DESCRIPTION OF THE PREFERRED EMBODIMENTS

Figure 1:
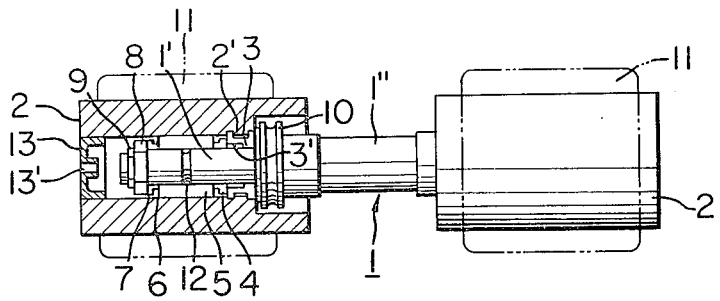
FIG. 1 is a partial sectional view of a conventional top roller.

Before describing this invention, a conventional top roller will be explained, referring to FIG. 1. An arbor 1 has a rotary part 1' of small diameter and a holding part 1" of large diameter. A step is formed between the rotary part 1' and the holding part 1". A support ring 3 fits the rotary part 1' of the arbor 1. Its projection 3' detachably fits a groove 2' of a rotary cylindrical shell 2 by a spring mechanism. One end 3 of the support ring 3 contacts the step of the arbor 1, and the other end contacts a first thrust ring 4. A needle 5 held by a retainer 6 is clamped between the first thrust ring 4 and a second thrust ring 7. The second thrust ring 7 is in contact with a collar ring 8 and a retaining ring 9 receiving the thrust weight of the needle 5. Numeral 10 denotes a loose rib for preventing the entry of fiber; numeral 11, a rubber blanket, numeral 12, an oil supply groove; and a numeral 13, a cap.

In a top roller of this construction, the distance between the centers of the two rotary cylindrical shells 2 is equal to the spindle gauge length of a spinning machine. The support ring 3 is elongated so that the rotary cells are detachable. A spring mechanism is disposed in a space formed between the projection 3' and the rotary part 1' of the arbor 1. Thus, the conventional top roller is defective in that the centers of the needle 5 and the rotary shells 2 may not correspond, the rotation of the rotary shells 2 may not be stable, and eccentric abrasion may be caused on the needle or the retainer. When oil such as grease is supplied around the needle 5, an oil supply groove is required in the rotary part 1' of the arbor, so that stains on fiber may be caused by leakage of the oil between the support ring 3 and the rotary part 1' of the arbor 1.

Figure 2:
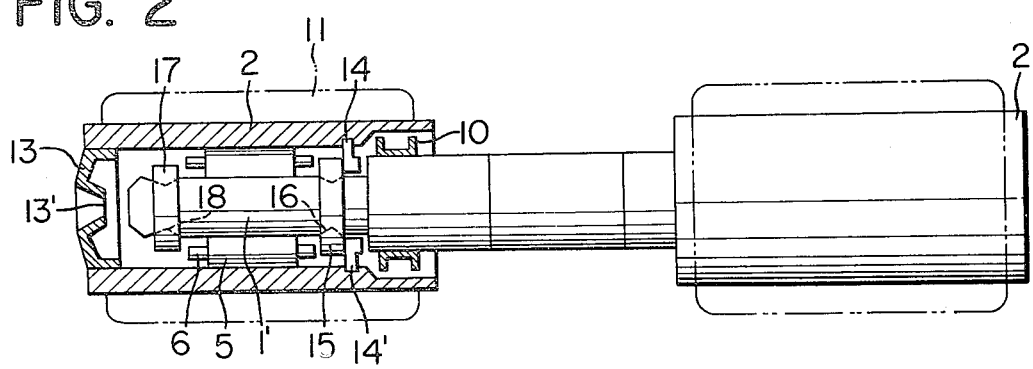
FIG. 2 is a partial sectional view of a top roller according to this invention.

FIG. 2 shows an embodiment of this invention wherein the same numerals denote similar parts as in FIG. 1. The outer circumference of a stop ring 14 with a projection 14' in contact with a step 1c of the arbor 1 fits an inner groove 2' of the rotary shell 2. A first retaining ring 15 in contact with the stop ring 14 fits a first groove 16 of the rotary part 1' of the arbor 1. A second retaining ring 17 is secured to a second groove 18 of the rotary part 1' of the arbor 1, spaced slightly apart from the retainer 6, and a needle 5 is held in the space formed therebetween.

In the embodiment of this construction, after the rotary part 1' of the arbor 1 is inserted in a hole of the stop ring 14, the retaining ring 15 is secured by the groove 16. The needle 5 held by the retainer 6 is then inserted, and the retaining ring 17 is secured by the groove 18. The manufacture is therefore easy, and the number of parts required is decreased in comparison with the conventional case shown in FIG. 1, thus lowering the manufacturing cost. Since the outer circumference of the stop ring 14 fits the groove 2' of the rotary shell 2 and its inner diameter is only slightly greater than the outer diameter of the rotary part 1' of the arbor 1, the grease supplied from an oil supply hole 13' of the cap 13 will not leak out from the outer circumference of the stop ring 14. The thickness of the stop ring 14 can be made small and the width of the retaining rings 15, 17 can be made small. Thus, the space between the cap 13 and the retaining ring 17 can be made larger so that the amount of the grease held can be increased and the supply time of the grease can be prolonged. Further, the stop ring 14 may be made extremely thin since it does not have to function as a spring. It is thus easy to place the needle 5 at the center of the rotary shell 2. Since the length of each rotary shell can be shortened, the manufacturing cost can be lowered. The stop ring 14 securely contacts the inner circumference of the rotary shell 2 and is clamped between the step 1c of the arbor 1 and the thrust ring. Thus, the entry of fiber can be significantly decreased in comparison with the conventional case.

Figure 3:
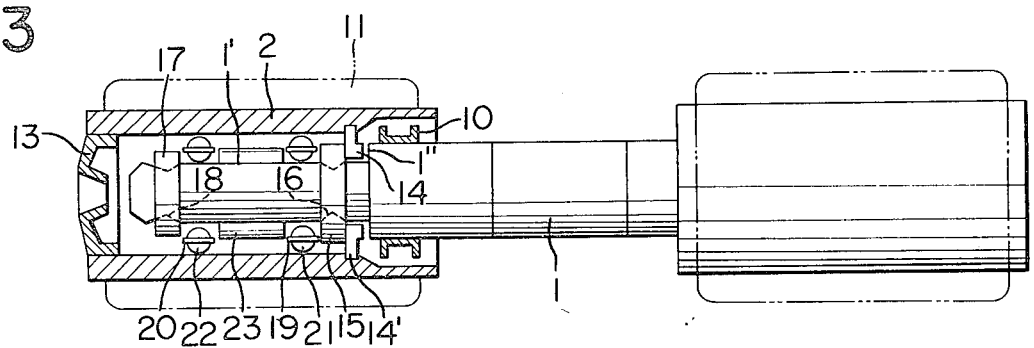
FIG. 3 is a partial sectional view of another embodiment of this invention.

FIG. 3 shows another embodiment of this invention wherein the same numerals denote similar parts as in FIG. 2. In this embodiment, 2 pairs of a plurality of balls 21 and 22 held by retainers 19 and 20, respectively, are disposed between the retaining rings 15 and 17 at opposite ends of a spacer 23. Two grooves are formed in the rotary part 1' of the arbor 1, and the balls 21 and 22 together with the retainers 19 and 20 are held in these grooves so that the spacer 23 is not required.

In this embodiment, as in the former embodiment, the stop ring 14, the retaining ring 15, the balls 21, the spacer 23, the balls 22 and the retaining ring 17 are mounted in the order named. Thus, the number of parts is decreased, the manufacture is easy, and the manufacturing cost is significantly lowered. The grease supplied from through oil supply hole 13' of the cap 13 is supplied to the balls through the space between the balls.

Figure 4:
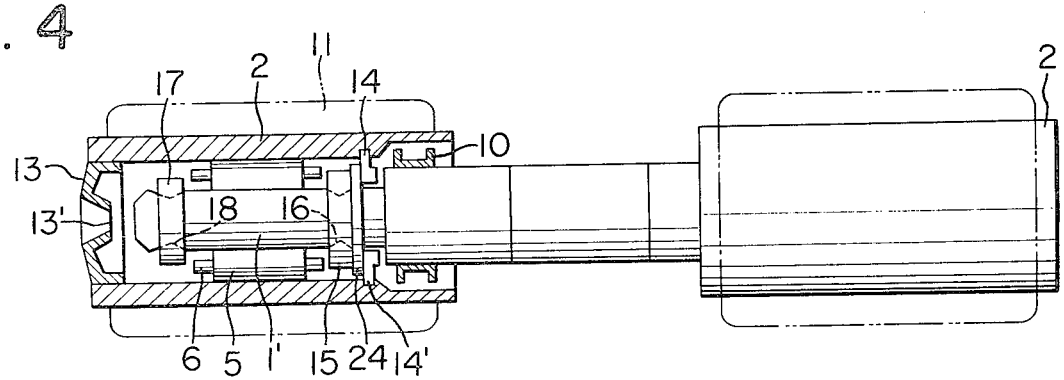
FIG. 4 is a partial sectional view of a further embodiment of this invention.

FIG. 4 shows a further embodiment of this invention which is different from the embodiment shown in FIG. 2, in that a metal ring 24 is interposed between the retaining ring 15 and the stop ring 14. The reason why it is constructed in this manner is that abrasion due to friction can be eliminated which may be caused when the stop ring 14 and the retaining ring 15 are made of synthetic resin. Since the frictional force is large when parts made of synthetic resin contact each other, the stop ring 14 and the retaining ring 15 are abraded and jolting in the thrust direction occurs. By interposing the metal ring 24 between the stop ring 14 and the retaining ring 15, the friction decreases and the rotation is smooth. The metal ring 24 can be used not only in the embodiment of FIG. 2 but also in the embodiment of FIG. 3.

In the above embodiment, the oil supply hole 13' is formed in the cap 13. However, this oil supply hole in the cap 13 may be eliminated and a sufficient amount of grease may be sealed in a bearing part inside the rotary cell in advance. A top roller may be thus provided wherein the entry of fiber is completely prevented and oil need not be supplied.

What is claimed is:

1. A top roller, comprising:
   an arbor having a cylindrical rotary part of relatively small diameter and a coaxial cylindrical holding part of relatively large diameter, with a step at the junction between said parts;
   a cylindrical shell rotatably mounted on said rotary part of said arbor by means of bearing means;
   an outer bearing means synthetic resin retaining ring axially disposed between said bearing means and an end of said rotary part of said arbor;
   an inner bearing means retaining ring axially disposed between said bearing means and said step;
   an annular synthetic resin stop ring coaxial with and surrounding said rotary part of said arbor, said stop ring having a generally cylindrical periphery and being axially disposed between said inner bearing means retaining ring and said step, the periphery of said stop ring engaging a groove in an inner wall of said cylindrical shell so that said stop ring is secured to said shell for axial movement therewith; and
   a metal ring coaxial with and surrounding said rotary part of said arbor and axially disposed between said stop ring and said inner bearing means retaining ring to reduce friction between said stop ring and said inner bearing means retaining ring, said stop ring restraining axial movement of said cylindrical shell with respect to said arbor.

2. The top roller according to claim 1, wherein said bearing means comprises a needle bearing.

3. The top roller according to claim 1, wherein said bearing means comprises a pair of axially spaced ball bearings.

* * * * *